United States Patent
King et al.

(10) Patent No.: US 9,532,173 B2
(45) Date of Patent: Dec. 27, 2016

(54) NO ENROLLMENT PROXIMITY TARGET DETECTION ON MOBILE DEVICES

(75) Inventors: Peter Chang King, San Mateo, CA (US); Luyi Wang, Santa Clara, CA (US); Parvinder Sawhney, Fremont, CA (US); Hyoung Wook Ham, Pittsburg, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 13/344,938

(22) Filed: Jan. 6, 2012

(65) Prior Publication Data

US 2013/0179376 A1    Jul. 11, 2013

(51) Int. Cl.
| | | |
|---|---|---|
| G06N 5/02 | (2006.01) | |
| G06F 15/18 | (2006.01) | |
| H04W 4/02 | (2009.01) | |
| G01S 5/02 | (2010.01) | |

(52) U.S. Cl.
CPC ............. *H04W 4/023* (2013.01); *G06F 15/18* (2013.01); *G06N 5/02* (2013.01); *G01S 5/0284* (2013.01)

(58) Field of Classification Search
None
See application file for complete search history.

(56) References Cited

U.S. PATENT DOCUMENTS

2008/0028063 A1*   1/2008   Holmes et al. ............... 709/224

OTHER PUBLICATIONS

Quercia, D. et al. "Using Mobile Phones to Nurture Social Networks". Pervasive Computing, vol. 9, No. 3 (Jul.-Sep. 2010). pp. 12-20.*
Quercia, D. et al. "Using mobile phones to nurture social networks." IEEE Pervasive Computing, vol. 9, No. 3, pp. 12-20, Jul. 2010 [retrieved online].*
Lavelle, B. et al. "Bluetooth familiarity: Methods of calculation,applications and limitations". In MIRW—Workshop at MobileHCI07: 9th International Conference on HCI with Mobile Devices, 2007 [retrieved from doras.dcu.ie].*
Quercia, D., et al. "Nurturing Social Networks Using Mobile Phones." Mar. 2010. [retrieved from http://www0.cs.ucl.ac.uk/staff/I.capra/publications/]. [retreived Apr. 9, 2015].*
Granqvist, J. "The Disco App-A Mobile Social Tool for Sharing Automatically Collected Bluetooth Presence Data Between Friends." (2009). <retrieved from Iup.Iub.Iu.se>. <retrieved Feb. 3, 2016>.*

* cited by examiner

*Primary Examiner* — Kakali Chaki
*Assistant Examiner* — Eric Nilsson
(74) *Attorney, Agent, or Firm* — Jefferson IP Law, LLP

(57) ABSTRACT

An apparatus and method for no enrollment proximity target detection of mobile devices. The method includes identifying at least one target user, detecting at least one target device, and for each target user and for each target device, determining a probability of the target user being associated with the target device.

34 Claims, 4 Drawing Sheets

|            | DEVICE ID 1 | DEVICE ID 2 | DEVICE ID 3 | DEVICE ID 4 | DEVICE ID 5 | DEVICE ID 6 | DEVICE ID 7 |
|------------|-------------|-------------|-------------|-------------|-------------|-------------|-------------|
| JOHN SMITH | .7          | 0           | 0           | .15         | .05         | 0           | .1          |
| MARY SMITH | 0           | 0           | 1           | 0           | 0           | 0           | 0           |
| MIKE JONES | .25         | .45         | 0           | .05         | 0           | .25         | 0           |
| ALEX LEE   | .05         | .05         | 0           | .8          | 0           | .1          | 0           |

FIG. 4

NO ENROLLMENT PROXIMITY TARGET DETECTION ON MOBILE DEVICES

BACKGROUND OF THE INVENTION

1. Field of the Invention

The present invention relates to an apparatus and method for detecting a person by a mobile device he or she carries. More particularly, the present invention relates to an apparatus and method for detecting a person by a target mobile device that the person carries where the target device is not enrolled in a locating service.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

One type of mobile terminal application that has gained popularity recently is an application for location based social networking. For example, applications such as FOURSQUARE and BANJO installed on a mobile terminal with Global Positioning System (GPS), such as a smartphone, will monitor a user's location and make information of that location available to other users. A user can use such applications to see where his friends are, whether any of his friends are nearby, or what users are at a particular location. Similarly, COLOR is a photo sharing application that shares location-tagged photos, such that any COLOR user within 100 feet can see the shared photos, regardless of whether the users know each other.

FIG. 1 is a diagram of a system for location based social networking according to the related art.

Referring to FIG. 1, a related art system includes mobile devices 101 and 102, that are each enabled to determine their location, such as by GPS, and that are each registered for a location based social networking service, a device 103 on which a user is following the mobile device 101, a GPS satellite 110, and a server 120. The mobile device 101 will determine its location, such as based on a signal from the GPS satellite 110. The mobile device 101 will then upload the location information to the server 120. The mobile device 102 similarly determines and transmits information of its location to server 120. The server 120 determines that the mobile devices 101 and 102 registered for the location based social networking service are in the same vicinity as each other, and will transmit information of the mobile device 101's location to the mobile device 102 in the same vicinity, so that a user of the mobile device 102 may see which registered users of the service are nearby. The server 120 will also transmit information of the mobile device 101's location to the device 103 which is not in the same vicinity, but which is following mobile device 101's updates. The mobile device 102 may optionally elect to receive information only of known users (e.g., friends) nearby. Similarly, the device 103 may also be implemented as a mobile device receiving information of known users (e.g., friends), regardless of the device 103's location.

However, a common limitation of such location based social networking has been that they are on an opt-in basis. That is, they require registration by the target users. This means that the applications are of limited use or value until a critical mass of friends of a user has joined the application services. A user may see little or no value in registering for FOURSQUARE, for example, if he has no friends who are already also on FOURSQUARE whom he wishes to follow or who wish to follow him, because he is unlikely to find, or be found by, friends until there is a reasonable probability that a friend who is also registered for the service is proximate to him.

Further, such applications are generally limited to users of mobile terminals such as smartphones. A user of a device that is not GPS-enabled has not previously been able to install the application or participate in the service. Although there is a converging trend of users upgrading to GPS-enabled smartphones when they change phones, there are still a very large number of non-GPS-enabled mobile phones and other mobile devices in use. For example, a 2011 Pew Internet Project survey found that 83% of American adults have a mobile phone of some kind, and fewer than half (42%) of those were smartphones (approximately 35% of the adult US population). A 2011 NIELSEN survey similarly found that 40% of US mobile phones were smartphones, and 60% were feature phones. Thus, the majority of US mobile phone users would be unable to enroll in an opt-in service, even if they wished to.

Accordingly, there is a need for an apparatus and method for detecting a person by a target mobile device that the person carries, where the target device is not enrolled in a locating service.

SUMMARY OF THE INVENTION

Aspects of the present invention are to address at least the above-mentioned problems and/or disadvantages and to provide at least the advantages described below. Accordingly, an aspect of the present invention is to provide an apparatus and method for detecting a person by a target mobile device that the person carries, where the target device is not enrolled in a locating service.

In accordance with an aspect of the present invention, a method for no enrollment proximity detection of mobile devices is provided. The method includes identifying at least one target user, detecting at least one target device, and for each target user and for each target device, determining a probability of the target user being associated with the target device.

In accordance with another aspect of the present invention, an apparatus for no enrollment proximity target detection of mobile devices is provided. The apparatus includes a wireless receiver for receiving a signal from at least one target mobile device, the signal including a unique identification of the at least one target mobile device, a user interface for entering information of at least one target user, a storage unit for storing information of the at least one target user and of the at least one mobile device, and a matrix correlating the at least one target user with the at least one target device, and a controller for determining a probability of each target user being associated with each target device and for storing the determined probabilities in the matrix.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 illustrates a form of a matrix for storing probability information of target users and target devices, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for detecting a person by a target mobile device that the person carries, where the target device is not enrolled in a locating service.

Figure 1:
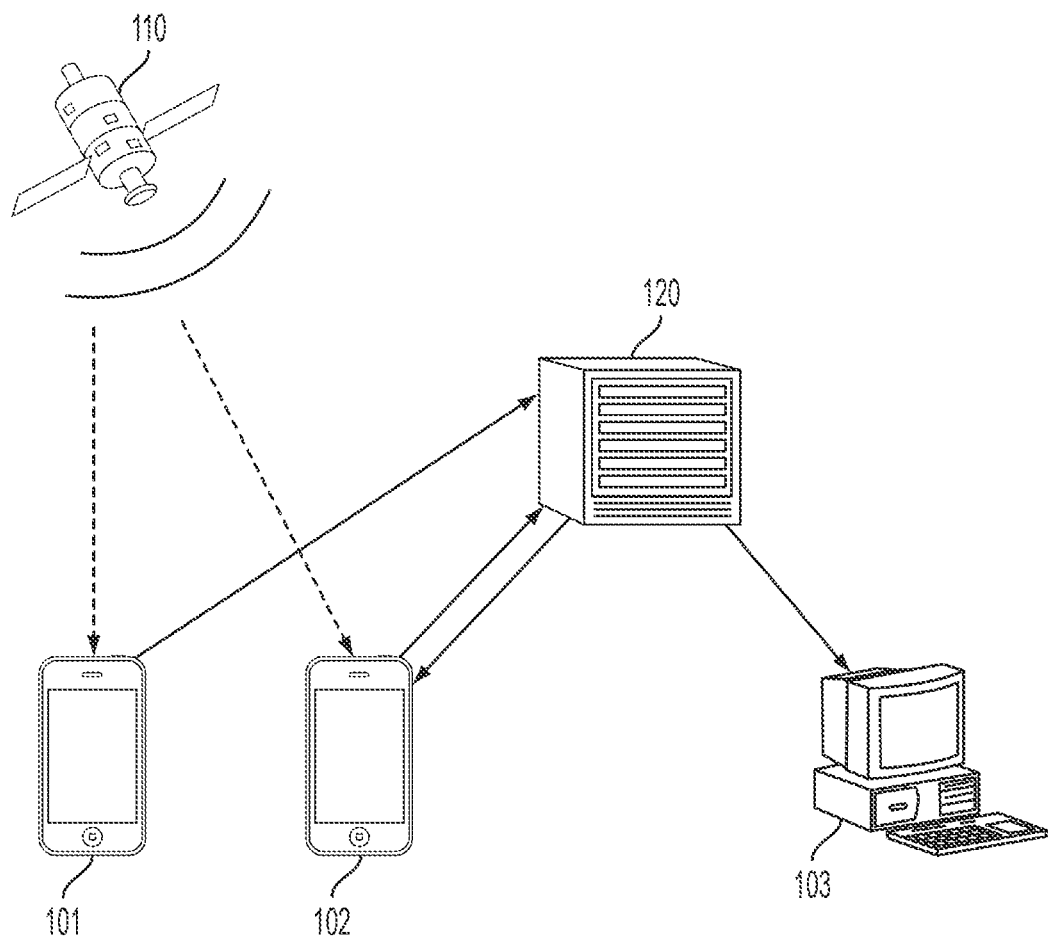
FIG. 1 is a diagram of a system for location based social networking, according to the related art.
Figure 2:
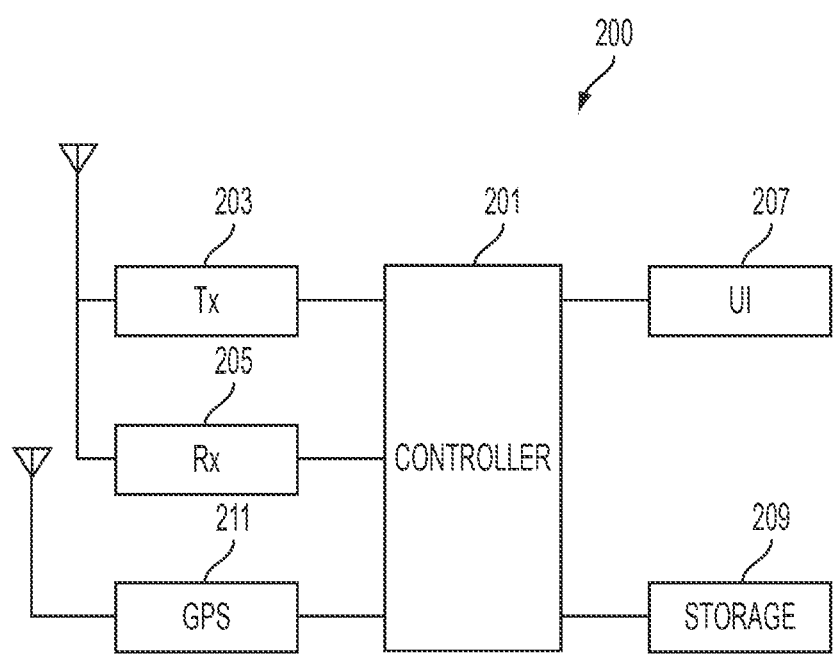
FIG. 2 is a block diagram of a mobile device, according to an exemplary embodiment of the present invention.

FIG. 2 is a block diagram of a mobile device according to an exemplary embodiment of the present invention.

Referring to FIG. 2, the mobile device 200 includes a controller 201, a wireless transmitter 203, a wireless receiver 205, a User Interface (UI) 207, and a storage unit 209 comprising memory. A GPS receiver 211 may also be included, although it is not required. Alternatively, the mobile device 200 may determine its location based on signals received through the wireless receiver 205. The controller 201 is capable of executing all operating functions of the mobile device 200, including calculating its location based on the signals received through the wireless receiver 205 and/or the GPS receiver 211. The user interface 207 includes means such as a touchscreen or a keypad for a user to enter information and commands, and a display for the user to see information output from the mobile device 200. The storage unit 209 includes memory in which is stored an operating system, applications, and related data.

In an exemplary embodiment of the present invention, it is assumed that a person carries at least one mobile device. It is further assumed that the mobile device is particularly associated with that person. On this basis, if a particular device is known to be associated with a particular person, and the device is detected, then there is a strong probability that the associated person is present with the device.

Unless otherwise stated, herein the term "target user" will indicate a person sought to be located or identified, a "user" will indicate a person trying to determine who is around him and/or where the target user is located, and a "target device" will be a mobile device of the target user.

Location services are based on the assumption that people can be detected and identified by mobile devices they carry. It is assumed that if a device is known to be associated with a person, then if the device is detected and located, by implication the associated person is detected and located.

A device will be detectable and can be uniquely identified by, for example, WiFi, BLUETOOTH™, or periodic channel broadcasting messages that it transmits. Such messages will necessarily include the device's unique address to enable the device to receive communications.

With an exemplary embodiment of the present invention, a user's device will listen for transmissions from other devices. Whenever the user recognizes the presence of a target user, the user will enter that information into his device. It is not necessary for the user to learn or confirm the unique address of the target user's target device. It is also not necessary for the user to confirm that the target user carries a target device.

Figure 3:
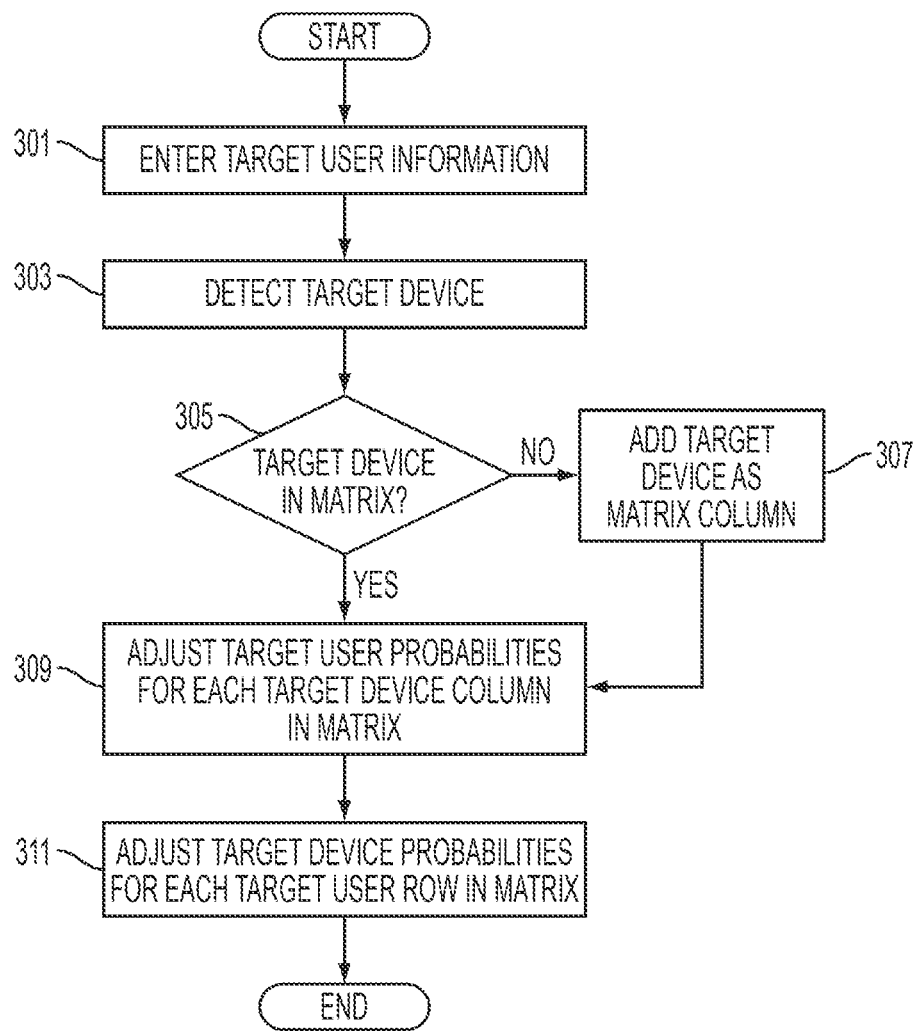
FIG. 3 is a flowchart showing a method of no enrollment location based social networking, according to an exemplary embodiment of the present invention.

FIG. 3 is a flowchart showing a method of no enrollment location based social networking, according to an exemplary embodiment of the present invention.

Referring now to FIG. 3, a user will enter information of at least one target user at step 301. The user enters information of whatever target users he identifies as being present. If a target user is newly added, then a new line is added to a matrix storing the related probabilities. The target user information includes a timestamp indicating when the matrix entry was last updated.

When a target user is confirmed as being present, at least one target device in the immediate vicinity is detected at step 303. For training purposes, it may only be required to determine what target devices are detected when the target user is confirmed as being present. The detected target devices may not be required to be registered for a service or to be capable of executing an application; it may only be required that target devices have a unique identification that can be wirelessly communicated, either broadcast or in response to an inquiry. The detected target device information in the matrix also includes a timestamp indicating when the matrix entry was last updated.

At step 305, it is determined whether the detected target device was previously correlated to any target users with entries in the matrix. If not, a column for the detected target device is added to the matrix at step 307.

At step 309, for each target user entry, a probability that the target user is associated with each target device in the matrix is adjusted. If a target device is detected when the target user is confirmed as being present, then the probability of that target device being associated with that target user is increased. If a target device is not detected when the target user is confirmed as being present, then the probability of that target device being associated with that target user is decreased. For each target user, the probabilities of being associated with each target device in the matrix row should total 100%.

At step 311, for each detected target device, a probability that the target device is associated with each target user in the matrix is adjusted. If a target user is confirmed as being present when the target device is detected, the probability of the target device being associated with that target user is increased. If a target user is not confirmed as being present when the target device is detected, then the probability of that target device being associated with that target user is decreased. For each detected target device, the probabilities of being associated with each target user in the matrix column should never exceed 100%. Because there are typically more target devices than target users, there may be target devices detected that are not actually associated with any user, and therefore their total probabilities are less than 100% likely to be associated with a target user.

When the user's device receives the information of a target user at step 301, the device records that information with information of whatever mobile devices are detected in the proximity at step 303, and stores that information together in a memory. That is, if information of a new target user is entered, the identification information of all mobile devices detected in the vicinity is recorded in association with the information of the new target user. In this example, it is presumed that the target user information is entered because the target user is present. However, the present invention is not limited thereto; for example, a user might enter the target user information for all his known co-workers while none of them are present, for example, while the user is at home or commuting, and indicate that the target users are not known to be present at the time of entry.

In each case, the target user information will be correspondingly associated with information of detected target devices, so as to eventually determine which target devices are most or least likely associated with which target users.

In an exemplary embodiment, the information is stored locally in the user's device. However, the present invention is not limited thereto; for example, the information may be uploaded or copied to a server.

FIG. 4 illustrates a form of a matrix for storing probability information of target users and target devices, according to an exemplary embodiment of the present invention.

Referring to FIG. 4, the information is saved in the form of a matrix. Each target user will be represented, for example, by a line of the matrix, with each subsequent column entry in the same line corresponding to a target device. The matrix is thus of dimensions Target Users× Target Devices, with each matrix entry being the calculated probability of the intersecting target user and target device being associated with each other. As the matrix is populated, many matrix entries will have a probability of 0, indicating that the particular target device has never been detected when the corresponding target user was confirmed to be present.

In the example of FIG. 4, an exemplary matrix is partially shown. Mary Smith has confirmed that Device ID 3 is her device, so that a corresponding matrix entry is 1, and all other entries for Mary Smith and for Device ID 3 are set to 0. Even with this positive confirmation, of course, the probabilities can still be adjusted; for example, Mary might subsequently purchase a new phone and give the old one to her son, in which case Mary would then sometimes be present without Device ID 3 being detected, and Device ID 3 would sometimes be detected when Mary is not present, so that corresponding probability would be decreased accordingly. John Smith has frequently been confirmed as present when Device ID 1 was detected, and over time the probability that he carries that device has been adjusted upward to 0.7; however, John Smith has also been confirmed present when Device IDs 4, 5, and 7 were detected, so there is a chance that one of those is actually his device. Mike Jones is frequently encountered with his teenage children present; Device IDs 1, 2, and 6 have often been detected when Mike Jones was present, but it has not yet been possible to determine with high confidence which of those three devices is probably his device.

A system according to exemplary embodiments of the present invention may be implemented on a mobile device such as a smartphone, and will determine a probability that a particular target device is associated with a particular target user. Each time the user trains the system by entering information of target users who are present, the precision of the data increases and the calculated probabilities become more accurate. If a target user and a target device are frequently confirmed as appearing together, then the probability of that target device being associated with that target user is increased at step 309 and/or 311 of FIG. 3. Contrariwise, if a target user is confirmed as present and a particular target device is not detected, then the probability of that target user being associated with that target device is decreased at step 309. Similarly, if a target device is detected but a particular target user is not confirmed to be present, then the probability of that target device being associated with that target user is decreased at step 311.

After the system has been trained with data, it may prompt the user for input. For example, if the system detects several target devices that it determines are relatively likely to be associated with particular target users, the system may prompt the user to confirm whether each of those target users is present at step 301 of FIG. 3. The system will present the user with a "best guess" of target users in proximity. The user can then validate the guesses of target users known to be in the area, and invalidate the guesses of target users not known to be in the area, at step 301 of FIG. 3.

A user can positively confirm that a target device is associated with a target user. For example, John is sitting in a teleconference. Mary enters the room and John's device indicates that a new device is detected in the vicinity. John asks Mary if that is her device, and Mary confirms that it is. John enters this information in the system, and the probability of that device being associated with Mary is adjusted to be 100%; thereafter, the system positively identifies Mary's presence whenever her target device is detected, and assigns zero probability that her target device is associated with any other target user.

More typically, it is expected that the system will not have direct confirmation that a particular target user is associated with a particular target device. For example, John attends a meeting with several co-workers and clients, and the system detects three target devices. John does not ask who carries the respective devices, but does ensure that the target user information is entered for each co-worker and client whom he can positively identify. In such cases, the probability is calculated and adjusted considering the latest entered data.

The user's device will keep track of detected target devices and target users. It is expected that the number of detected target devices can be much larger than the number of target users entered by the user. That is, it is expected that the user's device will detect proximate target devices, such as are carried by unknown people in the vicinity. For example, the user might go to a bar or a restaurant with a few friends, where there are many strangers nearby. It is expected that the user will not normally know everyone within the vicinity every time target user information is entered or updated.

Each entry of information, or "event," is entered into the database. The system forms a probability matrix for each target device and each target person, containing the calculated probabilities that a particular target device is associated with a particular target user. For example, if N target devices and M target users are entered, the system calculates the probabilities of a target device i ($1<=i<=N$) being associated with each target user j ($1<=j<=M$). The probabilities of a target device being associated with each target user, target device:{P(user_1), P(user_2), ... P(user_M)}, would total up to at most 1. Similarly, the probabilities of a target user being associated with each target device, User:{P(target device_1), P(target device_2), . . . P(target device_N)} would also total 1.

That is, a matrix is constructed where the column and row stand for the target user and target device, respectively. The value of a matrix entry [user_x][target device_y] stands for the probability that the target device_y is used by (associated with) target user_x. From this matrix statistical profiling rules can be generated based on the target user on who would show up together and also who is the likely owner when a target device appears.

As the system accumulates data, it will gradually determine that it is more likely that a particular target device is associated with a particular target user, and less likely that any other device is associated with that target user. The system will similarly determine that it is less likely that any other target user is associated with that target device.

More recent training information may be weighted to have a greater probability factor than older information. Thus, if a target user changes the target device he carries such as by trading in his old target device for a new smartphone device, the system will eventually increase the probability for the new device until association is determined with confidence. A time factor, for example, may reduce the probabilities at regular intervals.

The system's ability to identify with confidence which target users are associated with which devices will improve according to the data entered in training. There is no restriction that the identification be valid only for a particular target user. That is, if a user trains his system such that it determines with confidence that a particular target device is associated with a target user, that determination is presumed valid in general. Systems can share and exchange their target user and target device information to take advantage of the training each has experienced. Such sharing can be done directly from one user's device to another user's device if the devices both implement the system. Such sharing of data is most likely to be useful when there is overlap of target users—that is, when the two users sharing their data know target users in common.

Alternatively, the training data may be uploaded to a server. In such a case, any user device using the system may query the server to determine whether any other devices have entered training data on any of the target users or target devices in its own probability matrix. Thus a user may obtain a much larger set of training data for the target users and target devices in his matrix. As more training information is shared, the accuracy of the probabilities will rapidly improve.

If a server is used, the user's device may also upload information of its own location whenever a target device is detected. This information may be limited to target devices in the user's matrix, or may broadly include any detected target device. A user may thus elect to query the server for information on locations of target users according to where their target devices have been detected. A user may similarly elect to have the server push information of locations of particular target users and target devices to the user's device.

Thus, if John's device has identified by direct confirmation that a target device is associated with John's wife Mary, John may direct his device to query the server to see if any other user has detected Mary's device and uploaded its location to the server. John can thus often determine where Mary is, even if Mary's device lacks any GPS or comparable location determination ability. Similarly, John may instruct the server to notify his device whenever any user's device uploads information of a location where a device of John and Mary's child has been detected. John may thus readily check where and when the child's device was last detected, even if the child's device also lacks any GPS or comparable location determination ability.

This ability can also thus inform a user that a target user and/or target device have been detected nearby within a predetermined distance, even if they are not in close proximity to the user, such as when shopping at a same mall or attending a same concert or show, for example. The user can then contact the target user to ask, for example, whether they want to meet up, based on this information.

The ability to determine the locations of target devices according to detection by others can be restricted to protect privacy concerns. For example, John might only have access to location information of target users and/or target devices that have been positively identified in his stored matrix by direct confirmation, or that meet a minimum predetermined probability indicating high confidence.

Methodology—Initial Stage

In an initial state, there is no association of target users to devices. Assume John's device has an empty tagged target user list, a set of detected surrounding devices, and that John is among a group of people. The objective is to fill the tagged target user list by mapping the detected devices to the people who are present. Assume there are N detected target devices and M people present. Thus, $$D_{device}=\{d_i | \text{where } d_i \text{ stands for a device}, i<=N\} \quad (1)$$

$$G_{person}=\{g_j | \text{where } g_j \text{ stands for a person}, j<=M\} \quad (2)$$

Theoretically, N and M should be equal. In real life, N is usually greater than M; there will usually be more target devices found than target users entered.

It is assumed that John wishes to identify one target device $d_i$ from an N-entity devices list $D_N$ in an M-person group $G_M$. For $d_i$, there is an average possibility initially, $1/M$, that the target device $d_i$ belongs to any particular target user in that group. Here we denote $P_{ij}$ as the possibility that the device i belongs to a person j. This may be expressed as formula (3):

$$P_i = \Sigma P_{gj} = 1, \text{ where } P_{gj} \text{ all equal } 1/M \quad (3)$$

Methodology—Over Time

It is assumed that John continues to gather information over time. The probabilities of different target devices being associated with different target users will change according to the new information. The event $E_k$ is used to record each time the probability changes.

$$E_{event}\{e_k | \text{where } e_k \text{ stands for each event causing a probability change.}\} \quad (4)$$

For each event $e_k$, it would alter the association probability for each device-person pair. This introduces a coefficient vector $\alpha_j$, where $$\alpha_j = 1, \text{ when there is no event} \quad (5)$$

$$\Sigma \alpha_j = M \quad (6)$$

$$P(g_j) = \alpha_j \times 1/M \quad (7)$$

$$P_{gj} = \{\alpha_0, \alpha_1, \ldots, \alpha_m\} \quad (8)$$

Then the $P_{device}$ is denoted using formula (9):

$$P_{device} = \Sigma P(g_j) = \Sigma(\alpha_j \times 1/m) \quad (9)$$

The equation (3) is still satisfied under this revision. From equation (6), the coverage situation can be determined, where a device is identified under certain person j, is lim $\alpha_j = m$. The event may be denoted as a vector upon variance of $\alpha_j$, $$e_{oi} = \{\beta_0, \beta_1, \ldots, \beta_m\} \quad (10)$$

where of is a time series index for device i. Therefore the equation (8) is updated as follows:

$$P_{gj} = \{\alpha_0 + \beta_0, \alpha_1 + \beta_1, \ldots \alpha_m + \beta_m\} \quad (11)$$

Methodology—when a New Device is Added to the Set

The above is with regard to a particular device. In practice, the device list is usually longer than the person name list. So for the device in the device list, it should have a possibility P(i), different from $P_i$ which denotes the sum of possibility of target device i belonging to person j. P(i) is the possibility that target device i could be identified with regard to a person. So the following formula (12) is used to denote the overall possibility for a device set:

$$\Sigma P(i) = 1 \quad (12)$$

For the device set, there would be a vector:

$$P_d = \{P(i) | i < n\} = \{=P(0), P(1), \ldots, P(n)\} \quad (13)$$

When a new device is added into the device set, it is assigned an initial value $P(d) = V_{init}$. Eventually, the device is one-to-one mapped to a person. The ideal situation would thus be for some P(i), lim P(i)=1/m, but for some p(i), lim p(i)=0. Here a quantile is used to measure. Thus the following are set:

$$V_{init} = 0.25 \times 1/m \quad (14)$$

$$V_{trim} = 0.75 \times 1/m \quad (15)$$

and thus weight the importance of $V_{trim}$ such that the more recent data is more relevant.

The event series will result in p(i) changes. Here $e_i$ is written into two parts, one for p(oi) and one for group people $e_{oi}$ in equation (10).

$$e_i = \lambda p(oi) + e_{oi}, \text{ when } \lambda P(i) > V_{trim} \quad (16)$$

$$p(oi)_{new} = \lambda p(oi) \quad (17)$$

where $\lambda p(oi)$ represents a change of probability and $e_{oi}$ represents people's possession probability.

Methodology—Calculation

Until this point, all prerequisite processes are ready. The goal is to get $\lambda P(i) = 1/m$ and $\alpha = m$. Then the main calculation is performed based upon the event changes.

Equation (16) is intercepted as an event that causes device weight changes among multiple devices, and the target device in an m-person group is determined. Therefore, the trend of $\lambda P(i)$ and $\alpha$ should be similar. A target device becomes identical to a target user when a certain person is inclined to have the similar behavior model as the device.

$\lambda$ is the coefficient of P(i), and $\alpha$ indicates possibility changes of a target device belonging to people. There are many factors determining these, such as appearance occurrence, signal strength, etc. $\lambda$ and $\alpha$ are written into a multi-factor function:

$$\alpha = X(f_0, f_1, \ldots, f_k) \quad (18)$$

$$\lambda = Y(f_0, f_1, \ldots, f_k) \quad (19)$$

Therefore, there should be X~hY, where (0≤h≤1). The similarity matrix $M_h$ is constructed where M(i, j) indicates the similarity between device i and person j. The lim M(i, j)=1.

As discussed above, with exemplary embodiments of the present invention it becomes possible to identify and locate target users according to their associated target devices. It is not necessary for target users to be aware of or register for any tracking service. It is not necessary for the target device to be a "smart" device, to have access to a network, to have an ability to determine its own location, or to execute any application. Instead, a user trains the system based on confirming what target users are present and what target devices are detected.

At this point, it should be noted that the exemplary embodiments of the present invention as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more nontransitory processor readable media. Examples of the processor readable media include Read-Only Memory (ROM), Random-Access Memory (RAM), CD-ROMs, magnetic tapes, floppy disks, and optical data storage devices. The processor readable media can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for no enrollment proximity target detection of mobile devices, the method comprising:
    identifying at least one target user;
    detecting at least one target device according to a detected corresponding wireless signal that uniquely identifies the target device; and
    for each identified target user and for each target device, determining, by at least one processor, a probability of the identified target user being associated with the target device; and
    if the determined probability of a specific target user, among the at least one target users, being associated with a specific target device, among the at least one target devices, is at least a threshold value, determining that the specific target user is present when the specific target device is detected,
    wherein the determining of the probability is based on a history of detections of the at least one target device.

2. The method according to claim 1, further comprising storing information of the at least one identified target user and the at least one target device in a matrix form in a data storage device.

3. The method according to claim 2, wherein the information is stored by a user and the stored information is shared with another user.

4. The method of claim 2, wherein the information comprises one or more of a confirmed presence of the at least one identified target user, a date and time of the detection of the at least one target device, and a location of the detection.

5. The method according to claim 1, further comprising:
    entering, by a user, confirmation of a presence of an identified target user;
    detecting, concurrently with the confirming, the at least one target device;
    adjusting the probabilities according to the confirmation of the present identified target user and the detected at least one target device.

6. The method according to claim 5, wherein the adjusting comprises one or more of reducing a probability of the present identified target user being associated with a target device not concurrently detected and reducing a probability of a detected target device being associated with an identified target user not confirmed to be present.

7. The method according to claim 5, wherein the adjusting comprises increasing a probability of the present identified target user being associated with the at least one target device concurrently detected.

8. The method according to claim 5, wherein the adjusting comprises weighting a more recently entered confirmation or detection more heavily than a less recently entered confirmation or detection.

9. The method according to claim 5, wherein, if the user enters confirmation that an identified target user is associated with a specific target device, the determined probability of the identified target user being associated with the specific target device is adjusted to be one hundred percent.

10. The method according to claim 5, further comprising, when the determined probability that a target user is associated with the detected at least one target device is at least a predetermined likelihood, asking the user to enter confirmation of whether the identified target user is present.

11. The method according to claim 1, wherein information of the at least one identified target user and of the at least one target device are uploaded to a server.

12. The method according to claim 11, wherein, when a target device is detected, information of the detected target device and of a time and location of the detection is uploaded to the server.

13. The method according to claim 12, wherein a user queries the server for information of the detected target device.

14. The method according to claim 12, wherein, if the detected target device comprises one of the at least one target devices, information of the detected target device is transmitted to a user.

15. The method according to claim 14, wherein the information is transmitted if the location of the detection is determined to be within a predetermined distance from a location of the user.

16. The method of claim 1, wherein the at least one target device is not registered as being associated with the at least one identified target user in a publicly accessible service that tracks the at least one target device.

17. The method of claim 16, wherein the at least one target device comprises a mobile phone that cannot be registered in the publicly accessible service.

18. An apparatus for no enrollment proximity target detection of devices, the apparatus comprising:
    a wireless receiver for receiving a signal from at least one target device, the signal comprising a unique identification of the at least one target device;
    a user interface for entering identifying information of at least one target user;
    a storage unit for storing information of the at least one identified target user and of the at least one target device, and a matrix correlating the at least one identified target user with the at least one target device;
    a controller for determining a probability of each identified target user being associated with each target device and for storing the determined probabilities in the matrix,
    wherein the determining of the probability is based on a history of detections of the at least one target device, and
    wherein, if the determined probability of a specific target user, among the at least one target users, being associated with a specific target device, among the at least one target devices, is at least a threshold value, determining that the specific target user is present when the specific target device is detected.

19. The apparatus according to claim 18, further comprising a wireless transmitter for transmitting the stored information and the matrix.

20. The apparatus according to claim 19, wherein the stored information and the matrix are transmitted to another apparatus.

21. The apparatus according to claim 19, wherein the stored information and the matrix are transmitted to a server.

22. The apparatus according to claim 21, wherein, when a target device is identified, information of the target device and of a time and location of the identification of the target device is uploaded to the server.

23. The apparatus according to claim 22, wherein another apparatus according to claim 19 queries the server for information of the identified target device.

24. The apparatus according to claim 23, wherein, if the identified target device comprises one of the at least one target device, information of the identified target device is transmitted to the other apparatus.

25. The apparatus according to claim 24, wherein the information is transmitted if the location of the identification is determined to be within a predetermined distance from a location of the other apparatus.

26. The apparatus according to claim 22, wherein, if the user enters confirmation of a presence of an identified target user, the controller adjusts the probabilities according to a concurrently received signal identifying the at least one target device.

27. The apparatus according to claim 26, wherein the adjusting comprises the controller reducing one or more of a probability of the present identified target user being associated with a target device not concurrently detected and a probability of a detected target device being associated with an identified target user not confirmed to be present.

28. The apparatus according to claim 26, wherein the adjusting comprises the controller increasing a probability of the present identified target user being associated with a target device concurrently detected.

29. The apparatus according to claim 26, wherein the adjusting comprises the controller weighting a more recently entered confirmation or detection more heavily than a less recently entered confirmation or detection.

30. The apparatus according to claim 26, wherein, if the user enters confirmation that an identified target user is associated with a specific target device, the controller adjusts the determined probability of the identified target user being associated with the specific target device to be one hundred percent.

31. The apparatus according to claim 26, wherein, when the determined probability that a target user is associated with the detected at least one target device is at least a predetermined likelihood, the apparatus asks the user to enter confirmation of whether an identified target user is present.

32. The apparatus of claim 18, wherein the at least one target device is not registered as being associated with the at least one identified target user in a publicly accessible service that tracks the at least one target device.

33. The apparatus of claim 32, wherein the at least one target device comprises a mobile phone that cannot be registered in the publicly accessible service.

34. The apparatus of claim 18, wherein the information comprises one or more of a confirmed presence of the at least identified one target user, a date and time of the detection of the at least one target device, and a location of the detection.

* * * * *